US012548873B2

(12) United States Patent
Lee et al.

(10) Patent No.: US 12,548,873 B2
(45) Date of Patent: Feb. 10, 2026

(54) MULTI-TYPE FILTER ASSEMBLY COMPRISING A CAVITY FILTER AND PLURAL DIELECTRIC RESONATOR FILTERS COUPLED BY WINDOWS HAVING SPECIFIED NOTCH CHARACTERISTICS

(71) Applicant: KMW INC., Hwaseong-si (KR)

(72) Inventors: Kwon Won Lee, Hwaseong-si (KR); Sung Kyun Kim, Hwaseong-si (KR); Chang Ho Lee, Boryeong-si (KR)

(73) Assignee: KMW INC., Hwaseong-si (KR)

( * ) Notice: Subject to any disclaimer, the term of this patent is extended or adjusted under 35 U.S.C. 154(b) by 531 days.

(21) Appl. No.: 17/520,834

(22) Filed: Nov. 8, 2021

(65) Prior Publication Data

US 2022/0059915 A1 Feb. 24, 2022

Related U.S. Application Data

(63) Continuation of application No. PCT/KR2020/005972, filed on May 7, 2020.

(30) Foreign Application Priority Data

May 10, 2019 (KR) ........................ 10-2019-0054809
Apr. 23, 2020 (KR) ........................ 10-2020-0049494

(51) Int. Cl.
*H01P 1/208* (2006.01)
*H01P 7/10* (2006.01)

(52) U.S. Cl.
CPC .......... *H01P 1/2084* (2013.01); *H01P 1/2086* (2013.01); *H01P 7/10* (2013.01)

(58) Field of Classification Search
CPC ................................ H01P 1/2084; H01P 7/10
(Continued)

(56) References Cited

U.S. PATENT DOCUMENTS 5,969,584 A * 10/1999 Huang et al. .......... H01P 1/2053 333/219.1
6,081,175 A 6/2000 Duong et al.
(Continued)

FOREIGN PATENT DOCUMENTS

CN 102694220 A 9/2012
CN 203415666 U 1/2014
(Continued)

OTHER PUBLICATIONS

Extended European Search Report mailed Dec. 13, 2022 from the European Patent Office for European Application No. 20804916.3.
(Continued)

*Primary Examiner* — Benny T Lee
(74) *Attorney, Agent, or Firm* — Insight Law Group, PLLC; Seung Lee

(57) ABSTRACT

The present disclosure relates to a multi-type filter, and in particular, to a multi-type filter comprising: a cavity filter provided in any one (hereinafter, referred to as a "reference cavity") among a plurality of cavities formed in a housing to be open to one side; and dielectric resonator filters respectively provided in at least two cavities adjacent to the reference cavity (hereinafter, referred to as "adjacent cavities"), wherein, to control the notch characteristics between the cavity filter and the at least two dielectric resonator filters according to windows formed by cutting of portions of partition walls between the reference cavity and the adjacent cavities to be in communication with each other, the windows are provided at different positions, which is advantageous in that the cross-coupling design is very easy without the need to include a metal crossbar and the like for separate notch formation.

15 Claims, 18 Drawing Sheets

(58) Field of Classification Search
USPC .............................................. 333/202, 219.1
See application file for complete search history.

(56) References Cited

U.S. PATENT DOCUMENTS

| | | | | |
|---|---|---|---|---|
| 6,611,183 | B1 | 8/2003 | Peters | |
| 9,306,258 | B2 | 4/2016 | Chun et al. | |
| 2002/0005767 | A1 * | 1/2002 | Okazaki et al. | H01P 1/2084 333/219.1 |
| 2002/0105394 | A1 | 8/2002 | Barba Gea et al. | |
| 2004/0196120 | A1 * | 10/2004 | Andoh et al. | H01P 1/2086 333/219.1 |
| 2008/0252399 | A1 | 10/2008 | Wiehler | |
| 2009/0256652 | A1 | 10/2009 | Salehi et al. | |
| 2010/0090785 | A1 | 4/2010 | Panariello et al. | |

FOREIGN PATENT DOCUMENTS

| | | | |
|---|---|---|---|
| CN | 103985934 | A | 8/2014 |
| CN | 204205001 | U | 3/2015 |
| CN | 204289671 | U | 4/2015 |
| CN | 204481102 | U | 7/2015 |
| CN | 207800856 | U | 8/2018 |
| CN | 109119730 | A | 1/2019 |
| JP | 2002-026602 | A | 1/2002 |
| JP | 2008-205692 | A | 9/2008 |
| KR | 10-2005-0036522 | A | 4/2005 |
| KR | 10-2014-0101290 | A | 8/2014 |
| KR | 10-1897625 | B1 | 9/2018 |

OTHER PUBLICATIONS

Thomas J B: "Cross-Coupling in Coaxial Cavity Filters—A Tutorial Overview", IEEE Transactions on Microwave Theory and Techniques, IEEE, USA, vol. 51, No. 4, Part 02, Apr. 1, 2003 (Apr. 1, 2003), pp. 1368-1376, XP001145341, ISSN: 0018-9480, DOI: 10.1109/TMTT.2003.809180.

International Search Report mailed Aug. 3, 2020 for International Application No. PCT/KR2020/005972 and its English translation.

Non-final office action mailed Sep. 2, 2022 from the Chinese Patent Office for Chinese Application No. 202080035054.5.

Non-final office action mailed Oct. 4, 2022 from the Japanese Patent Office for Japanese Application No. 2021-566581.

Non-final Office Action mailed Apr. 8, 2023 from Chinese Patent Office for Chinese Application No. 202080035054.

Non-final Office Action mailed Jan. 16, 2024 from Chinese Patent Office for Chinese Application No. 202080035054.5.

Lu Qian et al, "A Novel Quadruple-Mode Cavity Resonator Filter With Wide Spurious-Free Window", School of Elecctronic and Information Engineering, South China University of Technology, 2018.

Wang Lushan, "Research And Design on Dielectric Resonator Cavity Filters", Southwest Jianotong University, Master Degree Thesis, Apr. 2013.

Zhang Yi-fei et al., "Structure design and analysis of a 4th-degree dielectric dual-mode filter", Information And Electronic Engineering, Jun. 2009.

* cited by examiner

| | Below Resonance | Above Resonance |
|---|---|---|
| Path 1-2-3 | -90°+90°-90°=-90° | -90°-90°-90°=-270° |
| Path 1-3 | -90° | -90° |
| Result | In phase | Out of phase |

| | Below Resonance | Above Resonance |
|---|---|---|
| Path 1−2−3 | −90°+90°−90°=−90° | −90°−90°−90°=−270° |
| Path 1−3 | +90° | +90° |
| Result | Out of phase | In phase |

| | Below Resonance | Above Resonance |
|---|---|---|
| Path 1-2-3 | -90°+90°-90°=-90° | -90°-90°-90°=-270° |
| Path 1-3 | -90° | -90° |
| Result | In phase | Out of phase |
| | | |
| Path 1-3-4 | -90°+90°-90°=-90° | -90°-90°-90°=-270° |
| Path 1-4 | -90° | -90° |
| Result | In phase | Out of phase |

| | Below Resonance | Above Resonance |
|---|---|---|
| Path 1-2-3 | -90°+90°-90°=-90° | -90°-90°-90°=-270° |
| Path 1-3 | +90° | +90° |
| Result | Out of phase | In phase |
| | | |
| Path 1-3-4 | +90°+90°-90°=+90° | +90°-90°-90°=-90° |
| Path 1-4 | -90° | -90° |
| Result | Out of phase | In phase |

MULTI-TYPE FILTER ASSEMBLY COMPRISING A CAVITY FILTER AND PLURAL DIELECTRIC RESONATOR FILTERS COUPLED BY WINDOWS HAVING SPECIFIED NOTCH CHARACTERISTICS

CROSS-REFERENCE TO RELATED APPLICATIONS

This application is a Continuation of International Application No. PCT/KR2020/005972, filed on May 7, 2020, which claims the benefit of and priority to Korean Patent Application Nos. 10-2019-0054809, filed on May 10, 2019; and 10-2020-0049494, filed on Apr. 23, 2020, the disclosure of which are herein incorporated by reference in their entirety.

TECHNICAL FIELD

The present disclosure relates to a multi-type filter assembly, and more specifically, to a multi-type filter assembly capable of maximizing the notch characteristics while presenting the standard of a filter arrangement design.

BACKGROUND ART

Generally, a filter applied to a base station apparatus is represented as a cavity filter and a dielectric resonator filter (DR filter).

As an example of the cavity filter, there can be a notch filter, which is a band-reject filter that attenuates signals within a specific narrow frequency range. The notch filter is a component used in various wireless communication base station and radio frequency (RF) bands, and a passive element having the characteristics that pass only a frequency in a specific band and attenuate the remaining frequency signals. The characteristics such as the insertion loss into the passband and the attenuation in the stop band among the important characteristics of the bandpass filter are important elements representing the performance of the filter. In particular, to reduce the interference between adjacent channels or the transmission/reception bands among the attenuation characteristics, the attenuation characteristic in the specific band should be significantly enhanced.

Meanwhile, like the cavity filter, the dielectric resonator filter serves to filter an input frequency with a minimum loss by a unique high quality factor (Q) value to output only a desired frequency in a specific band to an output terminal. The dielectric resonator filter adjusts the electromagnetic field characteristic of the cavity by adjusting an interval between a dielectric resonator installed in each cavity and a tuning screw disposed on an upper portion of the dielectric resonator, and adjusting an interval between the tuning screw installed on an upper portion of a window, which is formed on a partition wall located between the cavity and the cavity, and the window, thereby adjusting the resonant characteristic (i.e., center frequency) and the coupling characteristic (i.e., frequency band).

The dielectric resonator filter is becoming more advanced because it is compact and has a low loss.

However, until now, a method for strengthening each skirt characteristic of the cavity filter and the dielectric resonator filter is different and therefore, the cavity filter and the dielectric resonator filter cannot be applied to a single filter in combination.

SUMMARY OF THE INVENTION

Technical Problem

The present disclosure has been made in an effort to solve the problems associated with combining different types of filters, and an object of the present disclosure is to provide a multi-type filter assembly, which can apply a cavity filter and a dielectric resonator filter in combination, and design an opening direction of a window between cavities in which the respective filters are located.

Further, another object of the present disclosure is to provide a multi-type filter assembly, which can implement the desired skirt characteristic even without having a separate metal crossbar for strengthening the skirt characteristic between cavity filters.

Technical Solution

A multi-type filter assembly according to an exemplary embodiment of the present disclosure includes a cavity filter provided on any one (hereinafter, referred to a 'reference cavity') of a plurality of cavities formed in a housing to be opened to one side thereof; and a dielectric resonator filter provided on at least two cavities (hereinafter, referred to as an 'adjacent cavity') adjacent to the reference cavity, respectively, in which windows are designed to be offset from the center and positioned at different lateral locations relative to each other so that the notch characteristics between the cavity filter and the at least two dielectric resonator filters are adjusted by the windows that communicate with each other by cutting a part of a partition wall between the reference cavity and the adjacent cavity.

Here, the window can have a predetermined height from bottom surfaces of the reference cavity and the adjacent cavity.

Further, when assuming that two dielectric resonator filters are provided and provided adjacent to each other, and defining the dielectric filter as a first dielectric filter and a second dielectric filter, respectively, the window can include a first window formed on the partition wall between the cavity filter and the first dielectric filter and a second window formed on the partition wall between the cavity filter and the second dielectric filter.

Further, to generate a C-notch between the cavity filter and the first dielectric filter, the first window can be cut and formed to be offset towards an interface region between the first dielectric filter and the second dielectric filter.

Further, to generate an L-notch between the cavity filter and the first dielectric filter, the first window can be cut and formed to be offset away from the interface region between the first dielectric filter and the second dielectric filter, towards the side opposite to this interface region.

Further, when assuming that three dielectric resonator filters are provided and provided adjacent to each other near the reference cavity, and defining a dielectric filter located in the middle position among the dielectric filters as a first dielectric filter, a dielectric filter located on one side of the first dielectric filter as a second dielectric filter, and a dielectric filter located on the other side of the first dielectric filter as a third dielectric filter, the window can include a first window formed on the partition wall between the cavity filter and the first dielectric filter; a second window formed on the partition wall between the cavity filter and the second dielectric filter; and a third window formed on the partition wall between the cavity filter and the third dielectric filter.

Further, to generate a multi C-notch between the cavity filter and the first dielectric filter, the first window can be cut and formed to be offset towards an interface region between the first dielectric filter and the third dielectric filter, and the second window can be cut and formed to be offset either towards or away from an interface region between the first dielectric filter and the second dielectric filter.

Further, to generate a multi L-notch between the cavity filter and the first dielectric filter, the first window can be cut and formed to be offset away from the interface region between the first dielectric filter and the third dielectric filter, towards the side opposite to this interface region, and the second window can be cut and formed to be offset either towards or away from an interface region between the first dielectric filter and the second dielectric filter.

Further, the third window can be cut and formed to be offset either towards or away from the interface region between the first dielectric filter and the third dielectric filter.

Further, when assuming that three dielectric resonator filters are provided and provided adjacent to each other near the reference cavity, and defining a dielectric filter located in the middle position among the dielectric filters as a first dielectric filter, a dielectric filter located on one side of the first dielectric filter as a second dielectric filter, and a dielectric filter located on the other side of the first dielectric filter as a third dielectric filter, the window is not formed between the cavity filter and the first dielectric filter, and can include a second window formed on the partition wall between the cavity filter and the second dielectric filter and a third window formed on the partition wall between the cavity filter and the third dielectric filter.

Further, to generate a C-notch between the cavity filter and the second dielectric filter, the second window can be cut and formed to be offset toward inside provided with the first dielectric filter.

Advantageous Effects

The exemplary embodiment of the multi-type filter assembly according to the present disclosure can achieve the following various effects.

First, it is possible to apply the cavity filter and the dielectric filter to a single filter in combination.

Second, it is unnecessary to form a component such as a separate metal crossbar when forming the cross coupling between the respective cavities in which the cavity filter and the dielectric filter are provided.

Third, it is possible to implement the skirt characteristic desired by the designer through the change in the location of the window formed on the partition wall between the cavities.

BEST MODE FOR CARRYING OUT THE INVENTION

Figure 1:
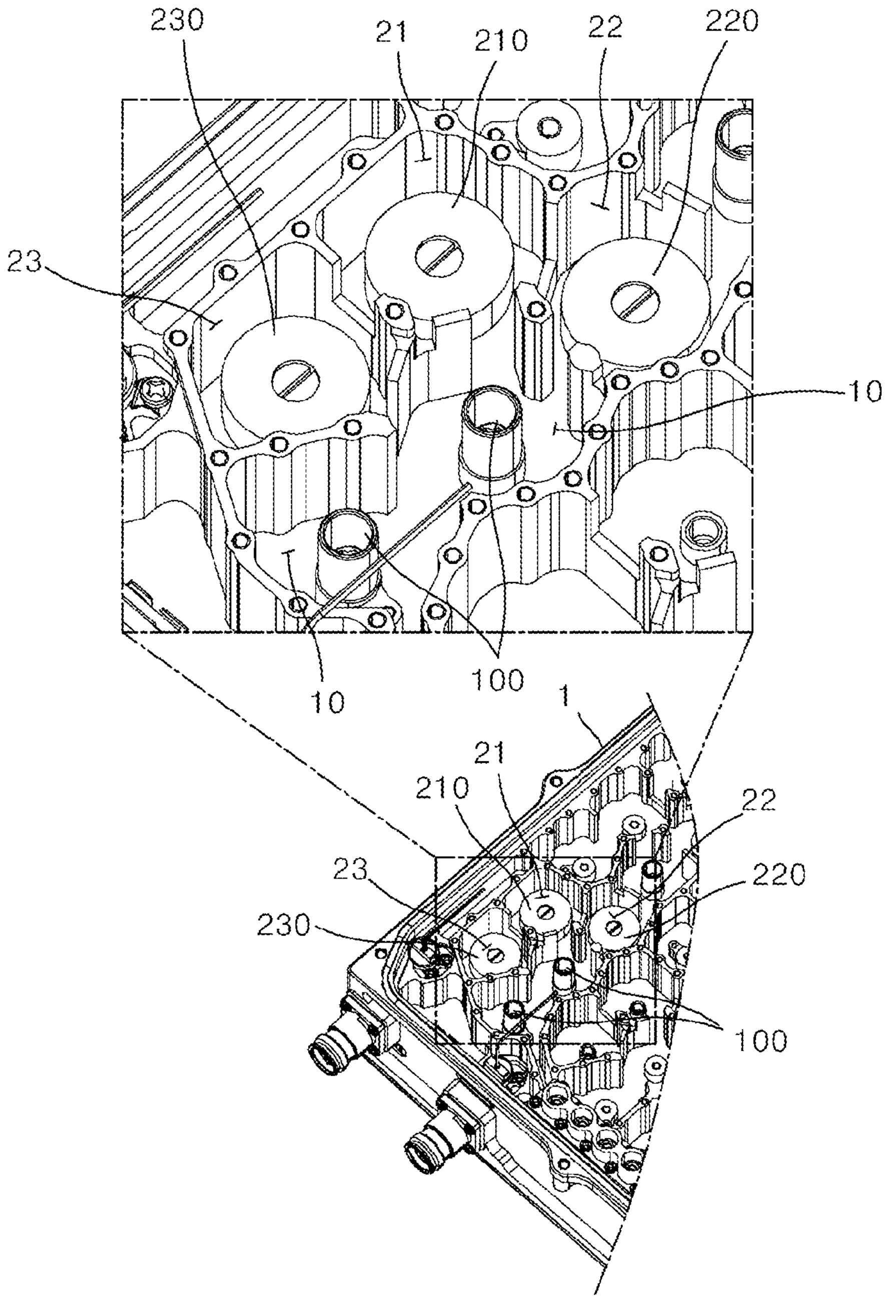
FIG. 1 is a perspective diagram and a partially enlarged diagram showing a multi-type filter assembly according to an exemplary embodiment of the present disclosure.

Hereinafter, a multi-type filter assembly according to exemplary embodiments of the present disclosure will be described in detail with reference to the accompanying drawings. In adding reference numerals to components of each drawing, it should be noted that the same components are denoted by the same reference numerals as possible even if they are shown in different drawings. Further, in describing the exemplary embodiment of the present disclosure, the detailed description thereof will be omitted if it is determined that a specific description of the relevant known configuration or function obscures the understanding of the exemplary embodiment of the present disclosure.

In describing the components according to the exemplary embodiment of the present disclosure, the terms such as "first", "second", "A", "B", "(a)", and "(b)" can be used. These terms are merely to distinguish the component from other components, and the natures, orders, or sequences of the corresponding components are not limited to the terms. Further, unless defined otherwise, all terms used herein, including technical or scientific terms, have the same meanings as generally understood by those skilled in the art to which the present disclosure pertains. The terms as defined in the dictionaries used commonly should be interpreted as having the meanings consistent with the contextual meanings of the relevant technology, and unless clearly defined otherwise in the present application, should be not interpreted as ideally or excessively formal meanings.

Figure 2:
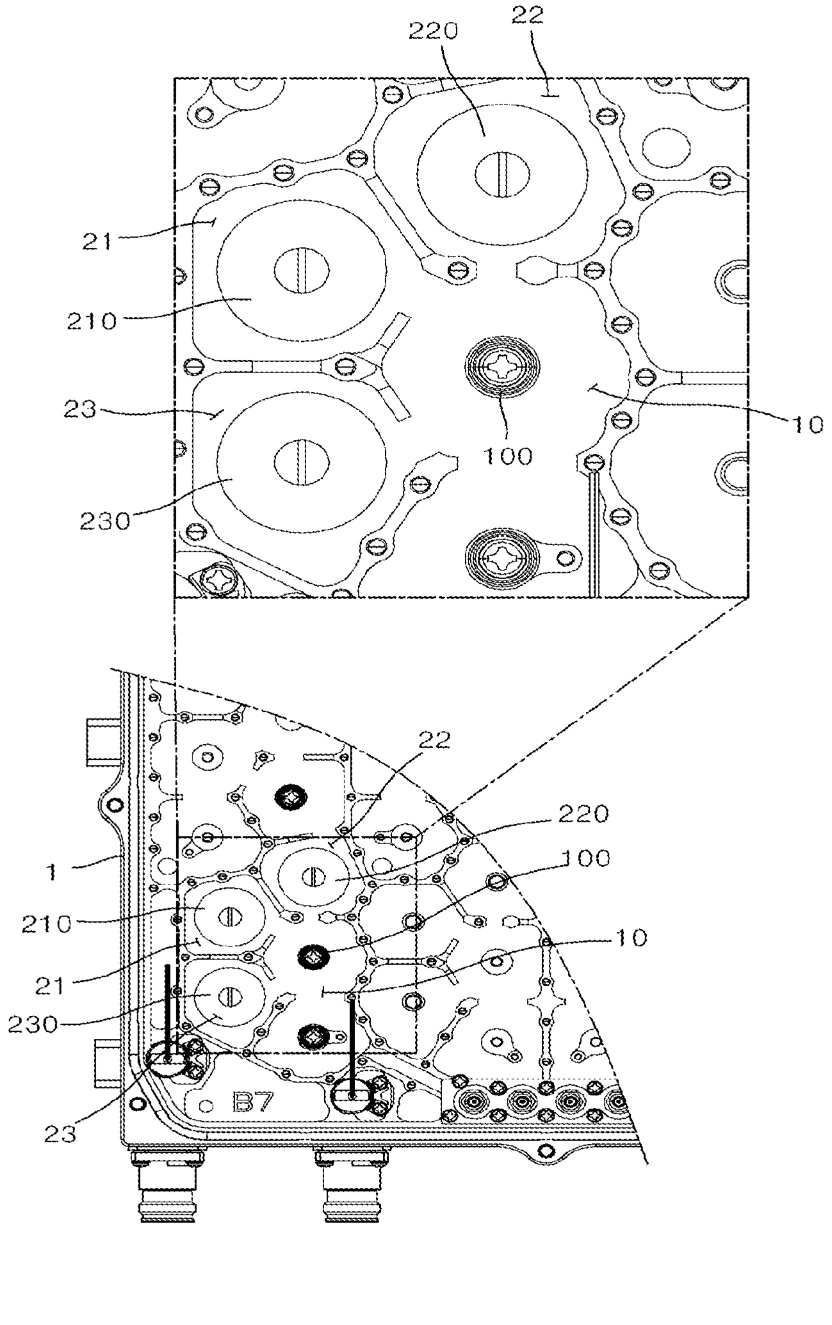
FIG. 2 is a plan diagram and a partially enlarged diagram showing the multi-type filter assembly according to the exemplary embodiment of the present disclosure.

FIG. 1 is a perspective diagram and a partially enlarged diagram showing a multi-type filter assembly according to an exemplary embodiment of the present disclosure, and FIG. 2 is a plan diagram and a partially enlarged diagram showing the multi-type filter assembly according to the exemplary embodiment of the present disclosure.

As shown in FIGS. 1 and 2, a multi-type filter assembly according to an exemplary embodiment of the present disclosure includes a housing 1 in which a plurality of cavities that are opened to one side thereof are formed. The housing 1 can be formed with the plurality of cavities (see reference numerals 10, 21, 22, 23 in FIGS. 1 and 2), in which at least any one of a cavity filter 100 and dielectric resonator filters 210, 220, 230 can be installed, to be opened to one side thereof.

Each of the cavity filter 100 provided with a resonator made of a metal material for resonance in a transverse electric mode and magnetic (TEM) mode, and the dielectric resonator filters 210, 220, 230 provided with a dielectric resonator for resonance in a transverse electric (TE) mode can be provided in the plurality of cavities.

The multi-type filter assembly according to the exemplary embodiment of the present disclosure is a combination of a plurality of RF filters. As is already well known, the RF filter is a device configured to pass only a signal in a preset specific frequency band, and can be classified into a lowpass filter, a bandpass filter, a highpass filter, and a bandstop filter depending upon a filtering frequency band.

As the important characteristics of the filter, there are an insertion loss and a skirt characteristic, in which the insertion loss refers to a power at which a signal is lost through the filter, and the skirt characteristic refers to the steepness degrees of the passband and stopband of the filter.

The insertion loss and the skirt characteristic have the tradeoff relationship depending upon the order of the filter. In other words, as the order of the filter is higher, the relationship in which the skirt characteristic is good but the insertion loss is poor is established.

To improve the skirt characteristic of the filter while maintaining the insertion loss of the filter, a method for forming a notch (attenuation pole) is mainly used, which is a method for strengthening the skirt characteristic of the filter while maintaining the insertion loss of the filter by forming the notch in the specific frequency band.

The cross coupling method is well known as being generally used for forming the notch. Generally, the cross coupling is implemented using a coupling metal bar, and the coupling metal bar is installed to penetrate an inner wall (or partition wall) defining the cavity, thereby generating the coupling phenomenon between the associated resonators.

Figure 3A:
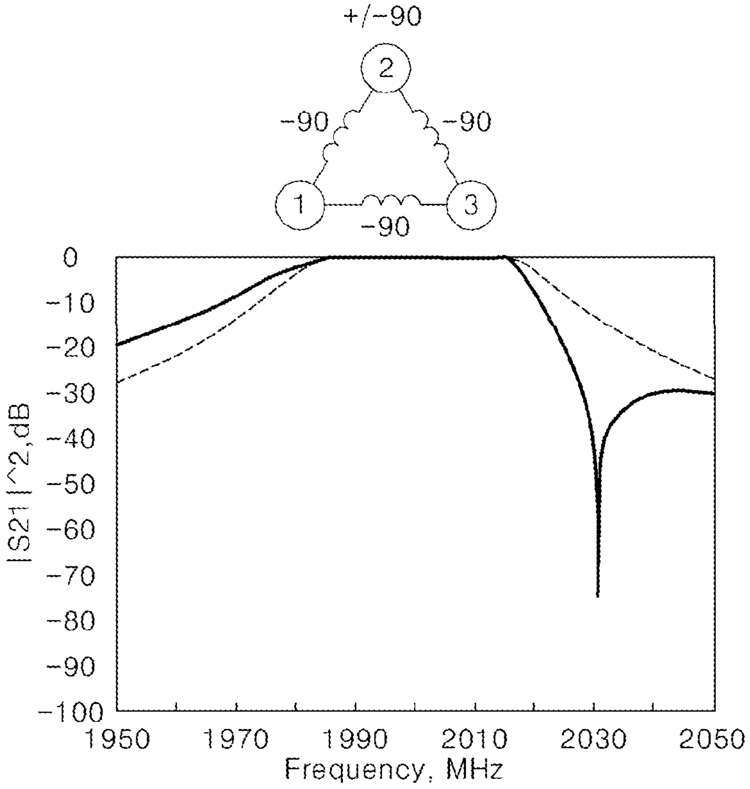
FIGS. 3A to 3D are conceptual diagrams and result tables for explaining a notch generation principle for each cross coupling structure.
Figure 3B:
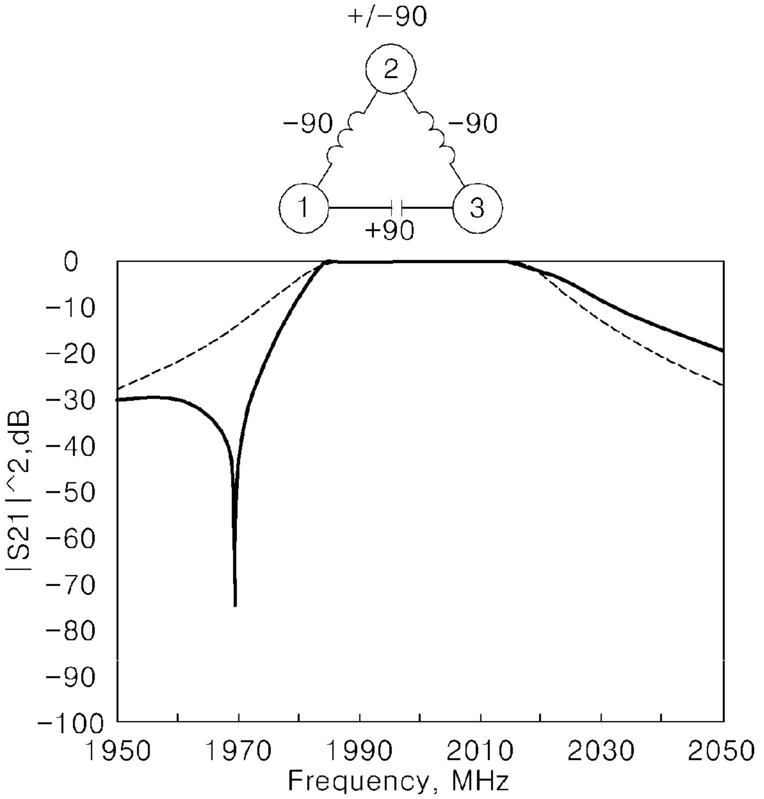
Figure 3C:
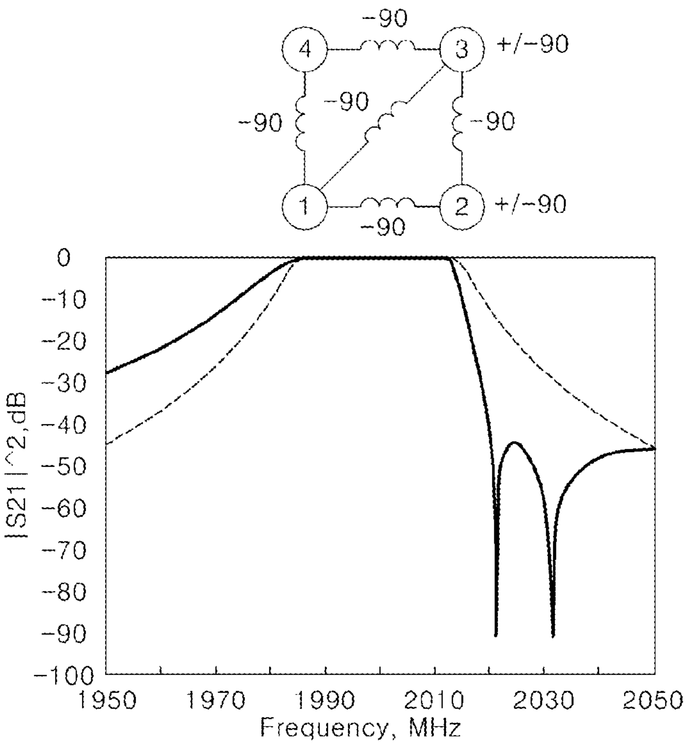
Figure 3D:
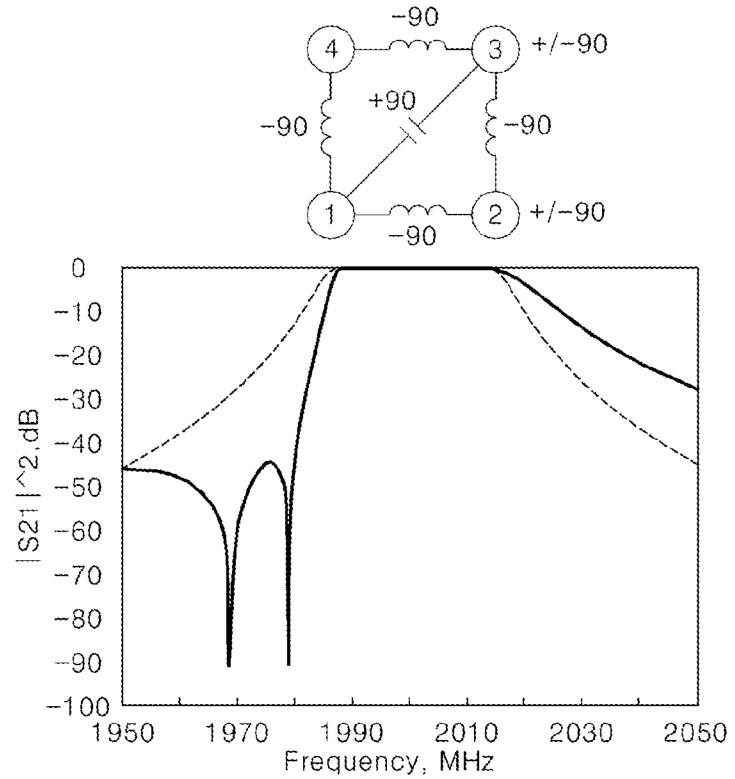
Figure 4A:
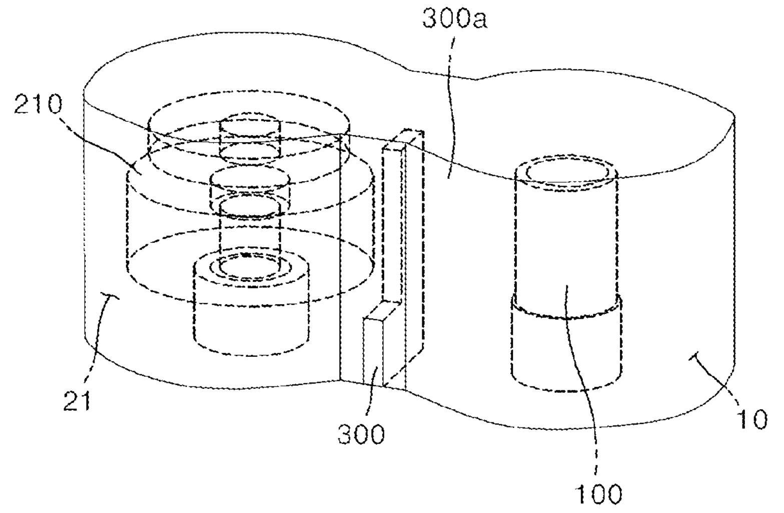
FIGS. 4A to 4C and 5A to 5C are perspective diagrams and electromagnetic field formation diagrams for explaining an L-Coupling and C-Coupling induction principle according to a shape of a window.
Figure 4B:
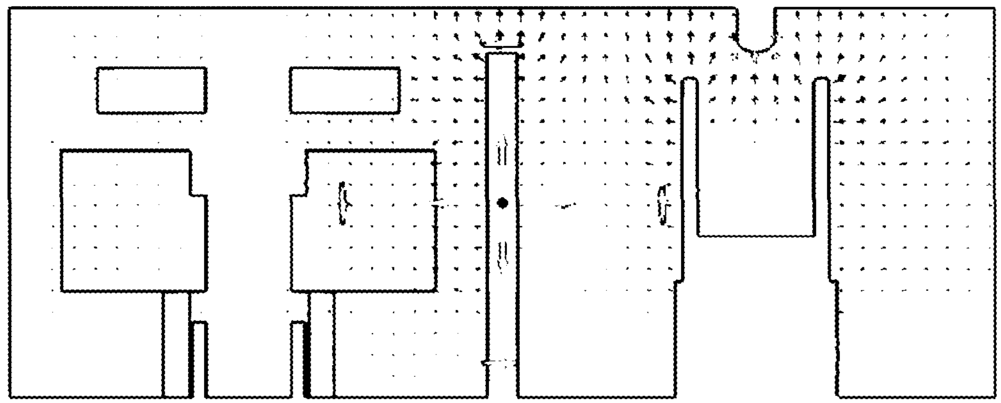
Figure 4C:
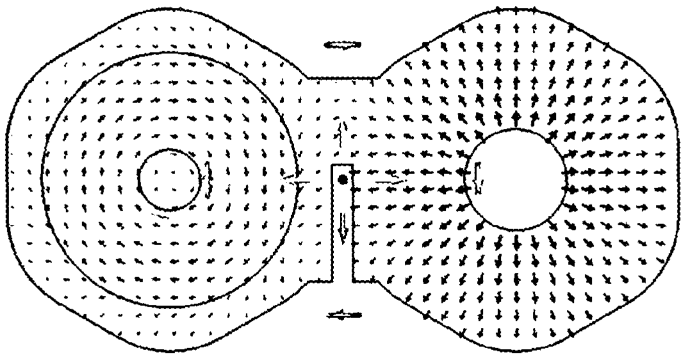

FIGS. 3A to 3D are conceptual diagrams and the result tables for explaining the notch generation principle for each cross coupling structure, and FIGS. 4A to 4C are perspective diagrams and electric-field generating diagrams for explaining L-Coupling and C-Coupling induction principles according to the shape of the window.

It is necessary to first understand the principle of generating the cross coupling in that the multi-type filter assembly according to the exemplary embodiment of the present disclosure, as shown in FIGS. 1 and 2, aims to be designed to generate the cross coupling between the cavity filter 100 provided with the general resonator made of the metal material and the dielectric resonator filters 210, 220, 230 provided with the dielectric resonator without separate configuration.

FIGS. 3A to 3D are conceptual diagrams and result tables for explaining a notch generation principle for each cross coupling structure. The graphs shown in FIGS. 3A to 3C are Bode plots representing frequency response, where the x-axis (abscissa) represents frequency and the y-axis (ordinate) represents gain (dB). As shown in FIGS. 3A and 3B, when the second resonance is a phase of 90 degrees phase or a phase of −90 degrees in the L-Cross Coupling structure or the C-Cross Coupling structure, the notch is not generated when the phase of the L-Coupling or the phase of the C-Coupling for forming the cross-coupling is the same as a phase passing a 1-2-3 path and a phase passing a 1-3 path, whereas the notch is generated when there occurs a phase difference of 180 degrees. Therefore, in FIG. 3A, the notch is not generated for In phase, but an L-notch is generated for Out of phase, and even in FIG. 3B, the notch is not generated for In phase, but the C-notch is generated for Out of phase.

Meanwhile, as shown in FIGS. 3C and 3D, when the second resonance is the phase of 90 degrees or the phase of −90 degrees in a Multi L-Cross Coupling structure or a Multi C-Cross Coupling structure, the notch is not generated when the phase of the L-Coupling or the phase of the C-Coupling for forming the cross coupling is the same as the phase passing the 1-2-3 path and the phase passing the 1-3 path, whereas the notch is generated when there occurs the phase difference of 180 degrees. Further, the notch is not generated when the phase passing the 1-3-4 path is the same as the phase passing the 1-4 path, whereas the notch is generated when there occurs the phase difference of 180 degrees. Therefore, in FIG. 3C, the notch is not generated for In phase, but the Multi L-notch is generated for Out of phase, and in FIG. 3D, the notch is not generated for In phase, but the Multi C-notch is generated for Out of phase.

Here, the coupling between the cavity filters 100 using the metal resonator is generally generated in the longitudinal direction, and implemented in an even mode with the same phase, and the coupling between the dielectric resonator filters 210, 220, 230 using the dielectric resonator is generally generated in the transverse direction, and implemented in the even mode with the same phase. In other words, a coupling mode between filters of the same types is implemented in the even mode with the same phase, but as in the multi-type filter assembly according to the exemplary embodiment of the present disclosure, the coupling mode induction method for the coupling mode between the filters of different types is different.

Referring to FIG. 4A, the cavity filter 100 and the dielectric resonator filter 210 are provided in adjacent cavities, respectively. Hereinafter, for the convenience of explanation, the cavity provided with the cavity filter 100 is referred to as a 'reference cavity 10', and the cavity provided with the dielectric resonator filter 210 is referred to as an 'adjacent cavity 21'.

A partition wall 300 is formed between the reference cavity 10 and the adjacent cavity 21, and the partition wall 300 can be provided with a window 300*a* that is formed as an offset opening connecting the reference cavity 10 and the adjacent cavity 21 by cutting a part of the partition wall 300, as shown in FIG. 4A.

FIGS. 4A to 4C shows a case where the window 300*a* is formed as an offset opening at one side (top in FIG. 4C), and when the direction of the electric-field of the cavity filter 100 faces upward on the drawing, referring to FIG. 4C, it can be seen that the direction of the electric-field generated in the dielectric resonator filter 210 in the adjacent cavity 21 is an even mode direction, that is, a clockwise direction on the drawing.

Figure 5A:
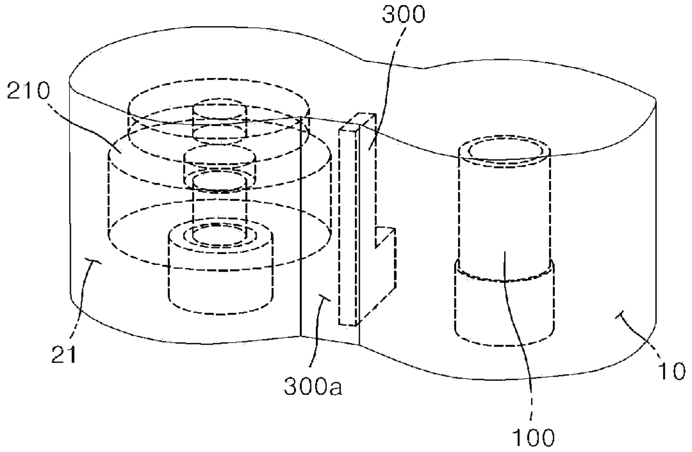
Figure 5B:
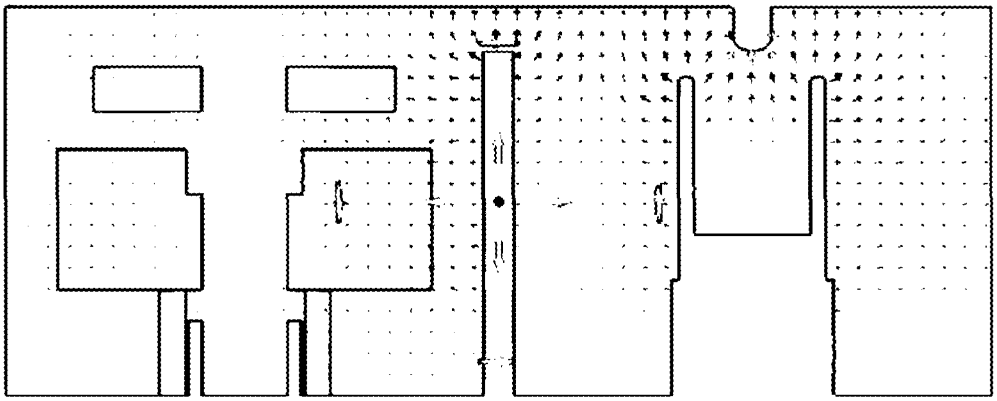
Figure 5C:
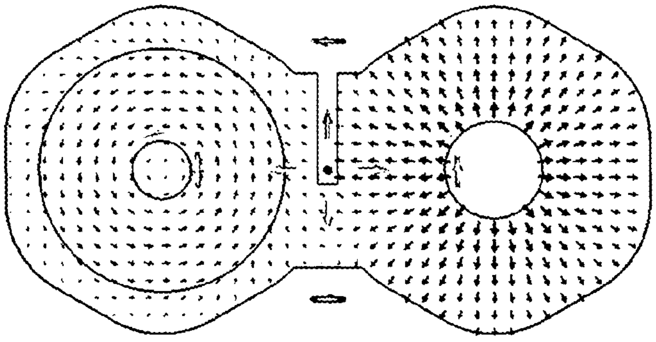

Meanwhile, FIG. 5A shows a case where the window 300*a* is formed as an offset opening at the other side (bottom in FIG. 5C). Referring to FIG. 5A, when the direction of the electric-field of the cavity filter 100 faces upward on the drawing, referring to FIG. 5C, it can be seen that the direction of the electric-field generated in the dielectric resonator filter 210 in the adjacent cavity 21 is an odd mode direction, that is, a counter clockwise direction on the drawing.

As described above, in the transverse mode of the dielectric resonator filter 210, the coupling changed in connection with the longitudinal mode of the cavity filter 100 depending upon a change (or location) of the shape of the window 300*a* can be generated, as illustrated in FIG. 5A. At this time, as described above, the cross coupling can be generated when the phase difference of 180 degrees is generated using the mode direction, that is, the even mode and the odd mode of the dielectric resonator filter 210.

In other words, the multi-type filter assembly according to the exemplary embodiments of the present disclosure to be described later includes, as shown in FIGS. 1 and 2, the cavity filter 100 provided in the reference cavity 10 (FIG. 5A) among the plurality of cavities formed in the housing 1 to be opened to one side thereof, and the dielectric resonator filters 210, 220 provided in at least two adjacent cavities 21, 22 adjacent to the reference cavity 10, respectively, and the windows 310*a*, 320*a* with respect to FIG. 6A can be designed to be offset at locations laterally different from each other around the center so that the notch characteristics between the cavity filter 100 and the at least two dielectric resonator filters 210, 220, 230 are adjusted by the windows 310*a*, 320*a* that interconnect the reference cavity 10 and the adjacent cavities 21, 22, 23 by cutting parts of partition walls 310, 320 or 310, 320, 330. Here, the windows 310*a*, 320*a* are preferably cut and formed to have a predetermined height from bottom surfaces of the reference cavity 10 and the adjacent cavities 21, 22. According to the exemplary embodiment, the windows 310*a*, 320*a* can be cut and formed deeper or higher than the intermediate heights of the reference cavity 10 and the adjacent cavities 21, 22.

FIGS. 6A, 6B,7A and 7B are diagrams showing C-notch generation design proposals according to the location of the window between two dielectric resonator filters adjacent to one cavity filter and graphs of the results thereof, and FIGS. 8A, 8B, 9A and 9B are diagrams showing L-notch generation design proposals according to the location of the window between two dielectric resonator filters adjacent to one cavity filter and graphs of the results thereof. The graphs shown in FIGS. 6B, 7B, 8B and 9B are Bode plots representing frequency response, where the x-axis (abscissa) represents frequency and the y-axis (ordinate) represents gain (dB).

Figure 7A:
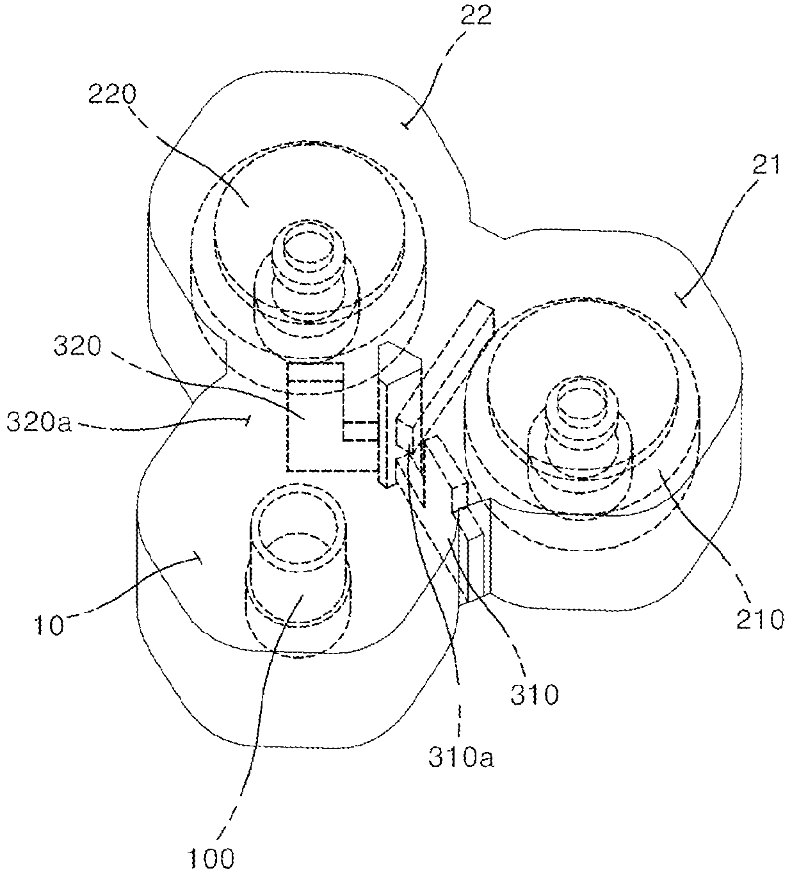

As shown in FIGS. 5A and 7A, according to the multi-type filter assembly according to the exemplary embodiment of the present disclosure, when assuming that two dielectric resonator filters 210, 220 are provided and provided adjacent to each other, and defining the dielectric filter as a first dielectric filter 210 and a second dielectric filter 220, the windows 310*a*, 320*a* can include a first window 310*a* formed on the partition wall 310 between the cavity filter 100 and a first dielectric filter 210 and a second window 320*a* formed on the partition wall 310 between the cavity filter 100 and a second dielectric filter 220.

Figure 6A:
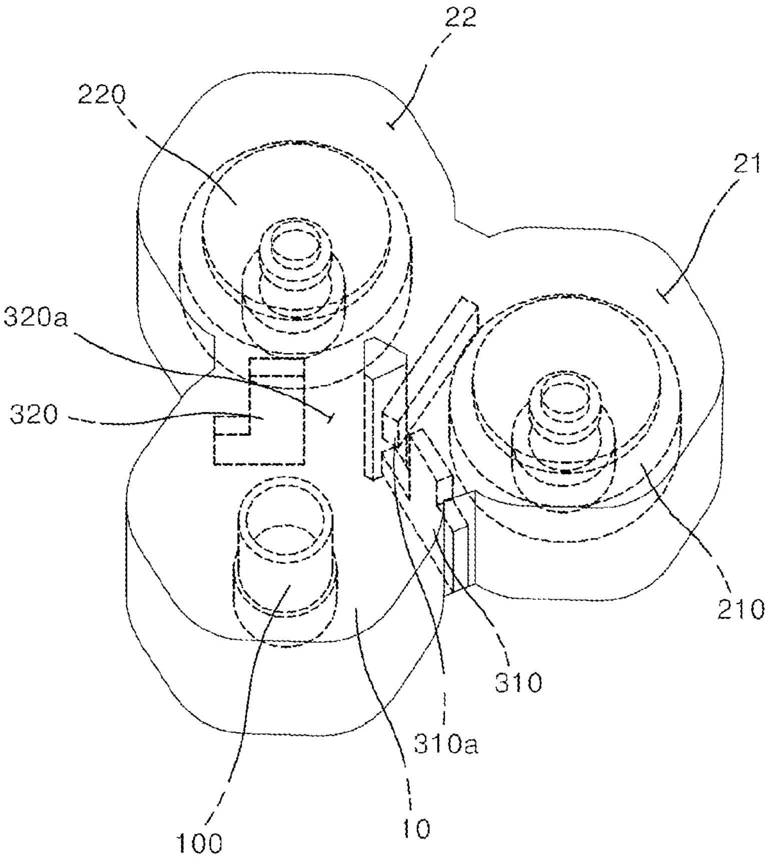
FIGS. 6A, 6B, 7A and 7B are diagrams showing C-notch generation design proposals according to the location of the window between two dielectric resonator filters adjacent to one cavity filter and graphs of the results thereof.
Figure 6B:
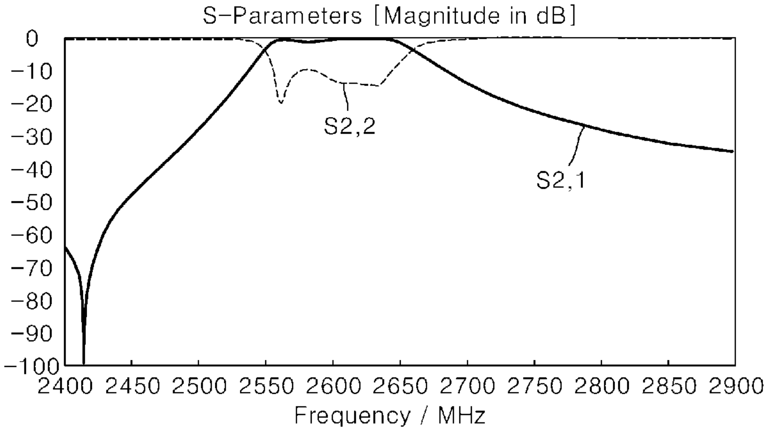

Here, to generate the C-notch between the cavity filter 100 and the first dielectric filter 210, as shown in FIG. 6A, the first window 310*a* can be cut and formed to be offset towards an interface region between the first dielectric filter 210 and the second dielectric filter 220. At this time, as shown in FIG. 6B, the C-notch is formed on the left of a passband by the first window 310*a* between the cavity filter 100 and the first dielectric filter 210.

Figure 7B:
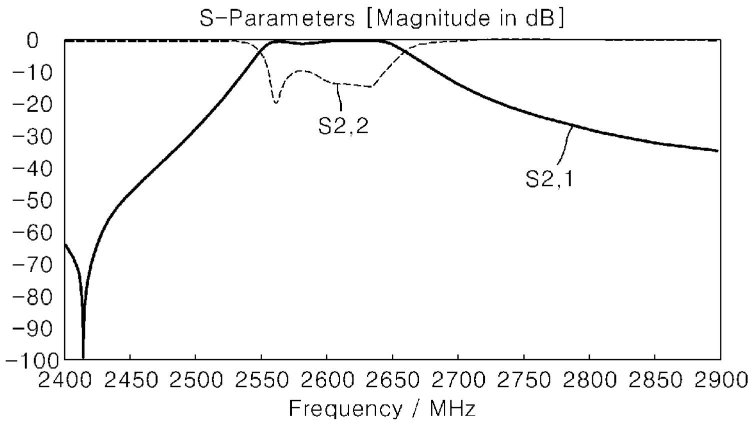

At this time, it can be confirmed that even if the location of the second window 320*a* originally formed by being cut and formed to be offset towards the interface region between the first dielectric filter 210 and the second dielectric filter 220 is changed to a position away from the interface region between the first dielectric filter 210 and the second dielectric filter 220 as shown in FIG. 7A, referring to FIG. 7B, this change in the location of the second window 320*a* does not affect the C-notch previously generated on the left of the passband by the first window 310*a* between the cavity filter 100 and a first dielectric filter 210.

Figure 8A:
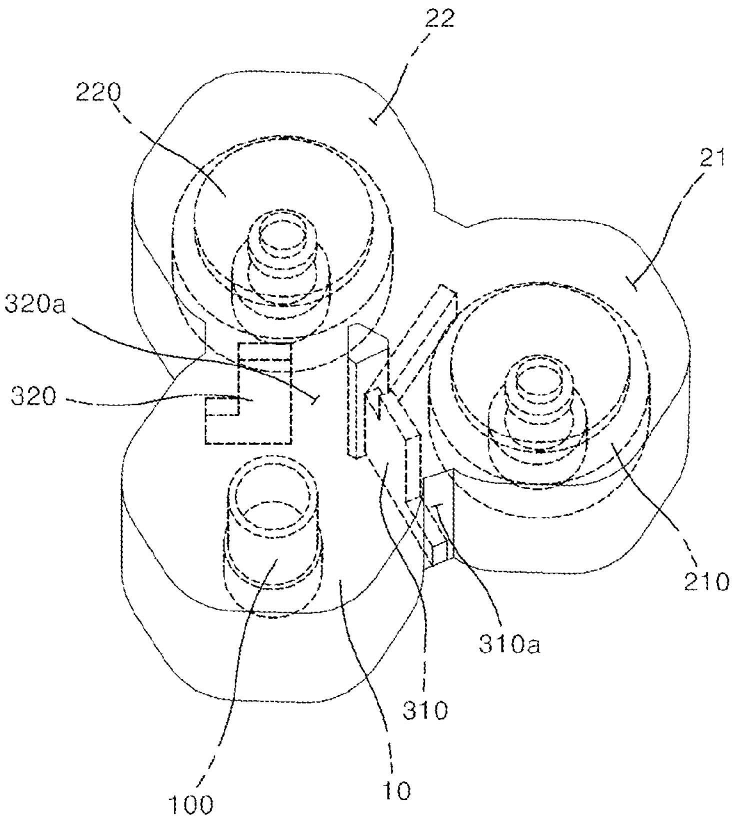
FIGS. 8A, 8B, 9A and 9B are diagrams showing L-notch generation design proposals according to the location of the window between two dielectric resonator filters adjacent to one cavity filter and graphs of the results thereof.
Figure 8B:
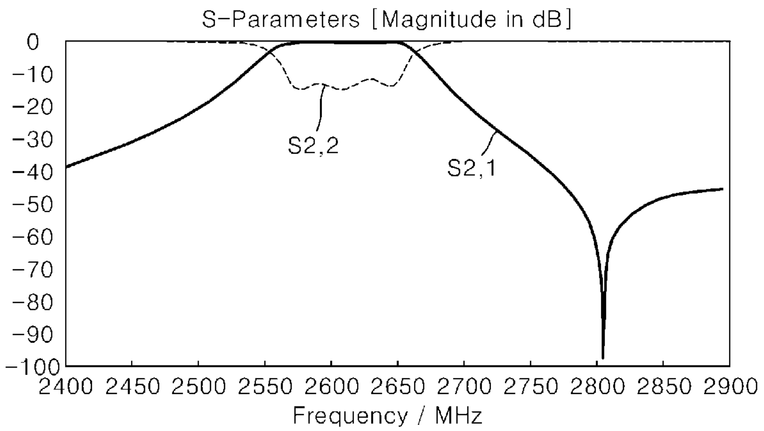

Further, as shown in FIG. 8A, to generate the L-notch between the cavity filter 100 and the first dielectric filter 210, the first window 310*a* can be cut and formed to be offset away from the interface region between the first dielectric filter 210 and the second dielectric filter 220, towards the side opposite to this interface region. Referring to FIG. 8B, the L-notch is formed on the right of the passband by the first window 310*a* between the cavity filter 100 and the first dielectric filter 210.

Figure 9A:
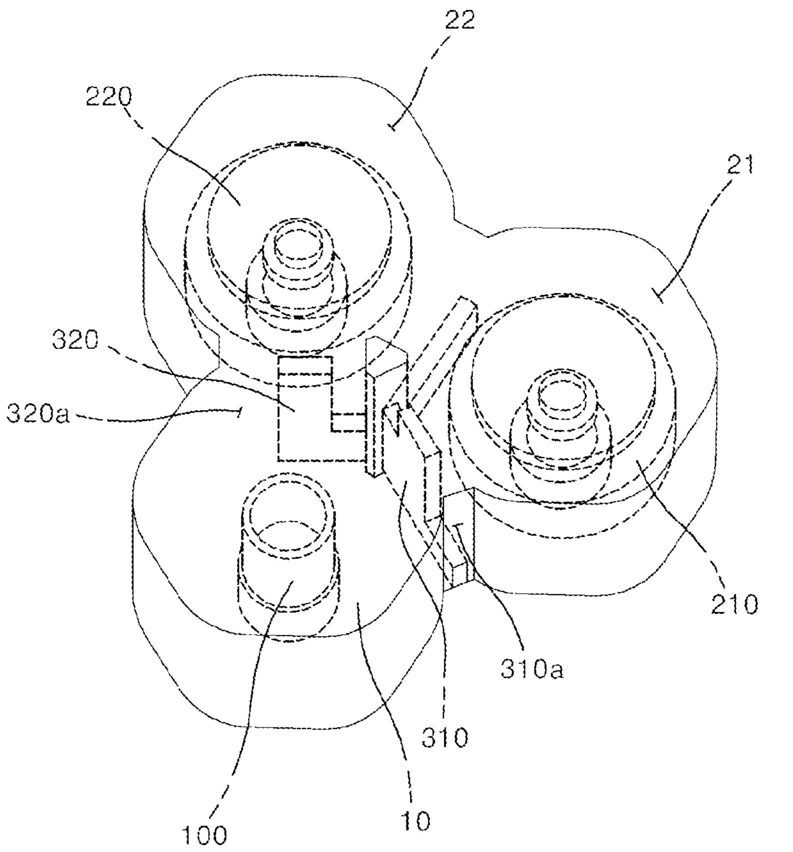
Figure 9B:
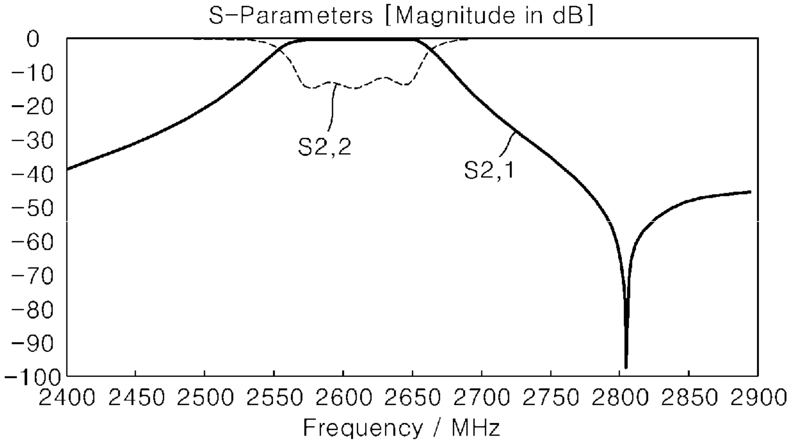

Further, here, it can be confirmed that even if the location of the second window 320*a* originally formed by being cut and formed to be offset towards the interface region between the first dielectric filter 210 and the second dielectric filter 220 is changed to a position away from the interface region between the first dielectric filter 210 and the second dielectric filter 220 as shown in FIG. 9A, referring to FIG. 9B, this change in the location of the second window 320adoes not affect the L-notch previously generated on the right of the passband by the cavity filter 100 and the first window 310*a* of the first dielectric filter 210.

Figure 10A:
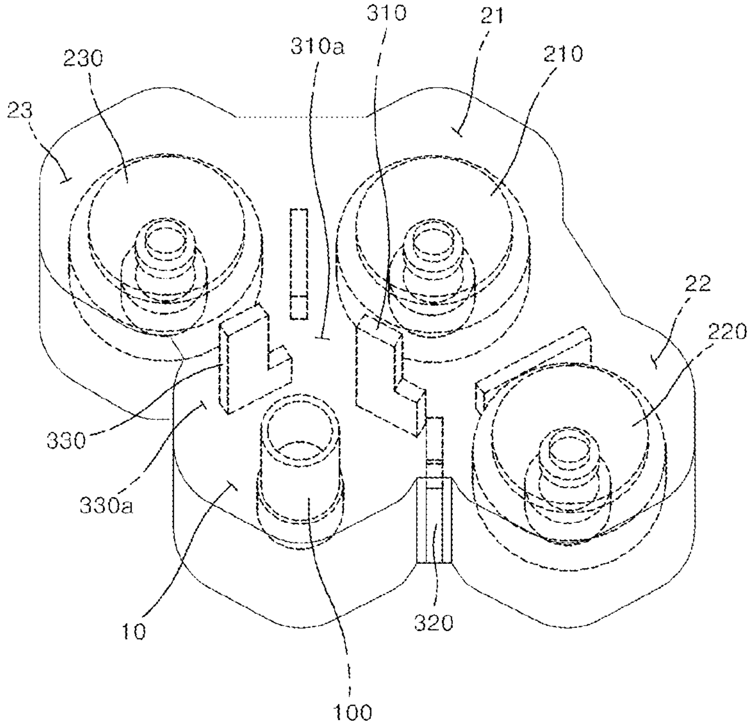
FIGS. 10A to 10C are diagrams showing a first notch generation design proposal according to the location of the window between three dielectric resonator filters adjacent to one cavity filter and a graph of the results thereof.
Figure 10B:
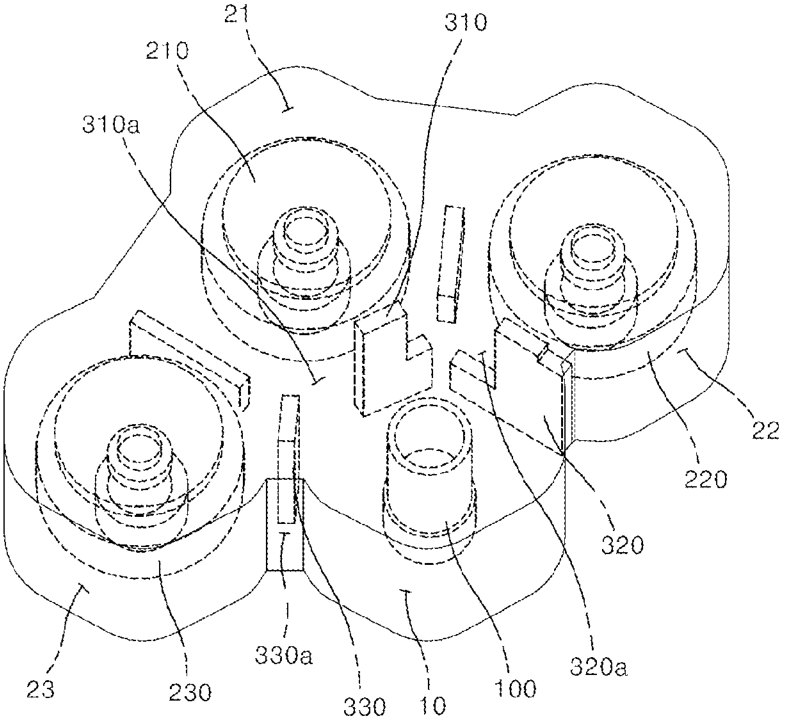
Figure 10C:
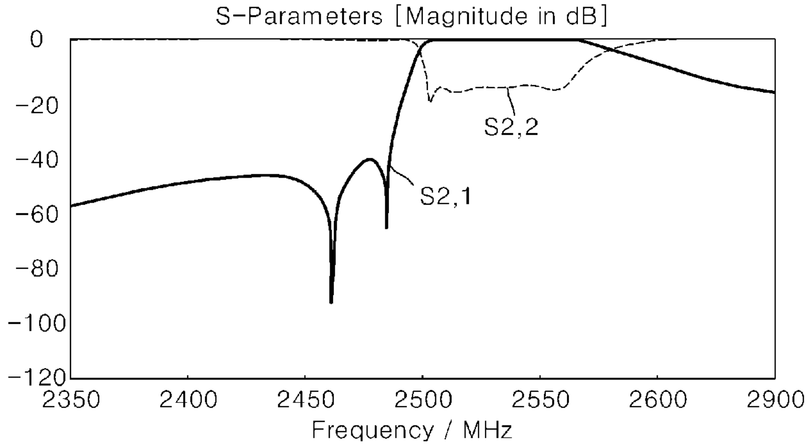
Figure 11A:
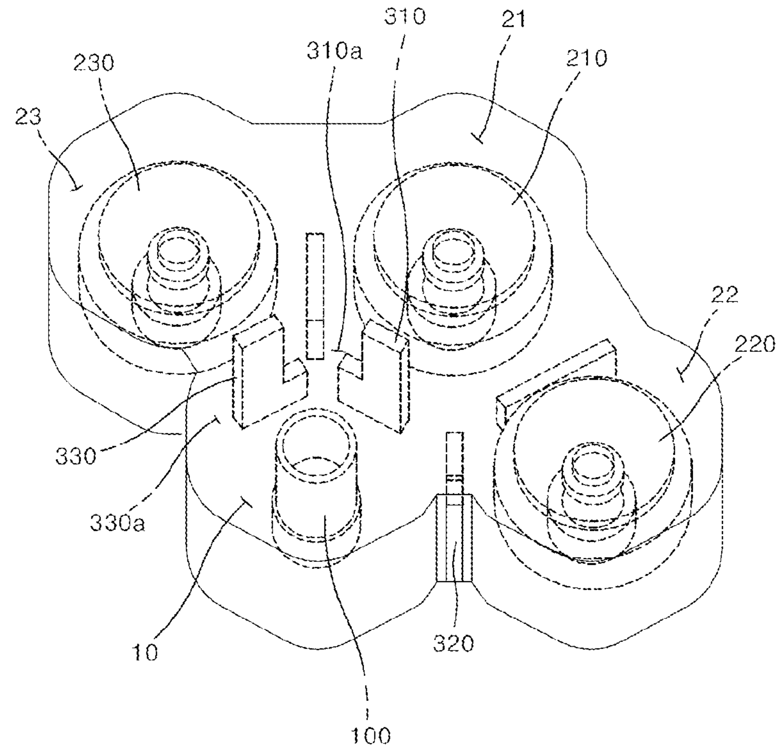
FIGS. 11A to 11C are diagrams showing a second notch generation design proposal according to the location of the window between three dielectric resonator filters adjacent to one cavity filter and a graph of the results thereof.
Figure 11B:
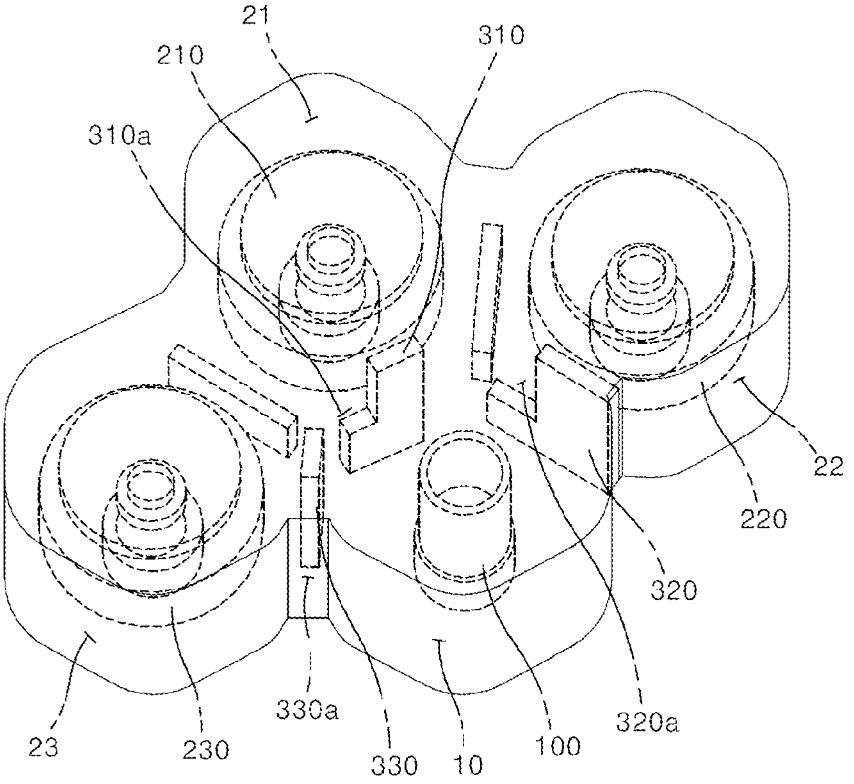
Figure 11C:
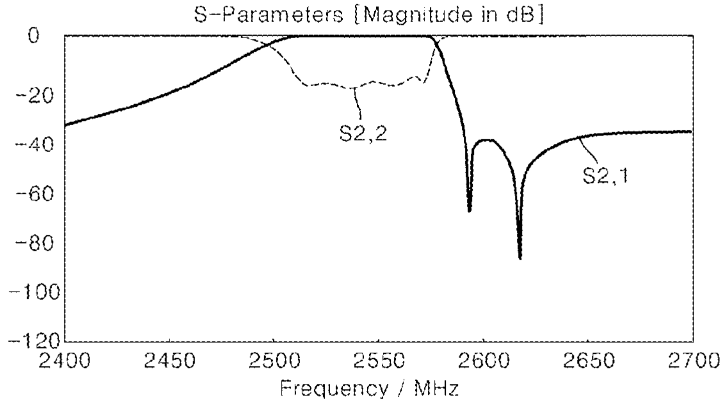

FIGS. 10A to 10C are diagrams showing a first notch generation design proposal according to the location of the window between three dielectric resonator filters adjacent to one cavity filter and a graph of the results thereof, and FIGS. 11A to 11C are diagrams showing a second notch generation design proposal according to the location of the window between three dielectric resonator filters adjacent to one cavity filter and a graph of the results thereof. The graphs shown in FIGS. 10C and 11C are Bode plots representing frequency response, where the x-axis (abscissa) represents frequency and the y-axis (ordinate) represents gain (dB).

As shown in FIGS. 10A and 10B and as shown in FIGS. 11A and 11B, according to a multi-type filter assembly according to another exemplary embodiment of the present disclosure, when assuming that three dielectric resonator filters 210, 220, 230 as shown in FIGS. 10A, 10B, 11A and 11B are provided and provided adjacent to each other near the reference cavity 10 as shown in FIGS. 10A, 10B, 11A and 11B, defining the dielectric filter located in the middle position among the dielectric filters as the first dielectric filter 210, and defining the dielectric filter located on one side of the first dielectric filter 210 as the second dielectric filter 220, and the dielectric filter located on the other side of the first dielectric filter 210 as a third dielectric filter 230, the window 300*a* can include the first window 310*a* formed on the partition wall 310 between the cavity filter 100 and the first dielectric filter 210, the second window 320*a* formed on the partition wall 320 between the cavity filter 100 and the second dielectric filter 220, and a third window 330*a* formed on the partition wall 330 between the cavity filter 100 and the third dielectric filter 230.

Here, to generate the multi C-notch between the cavity filter 100 and the first dielectric filter 210, as shown in FIGS. 10A and 10B, the first window 310*a* can be cut and formed to be offset towards an interface region between the first dielectric filter 210 and the third dielectric filter 230. Further, the second window 320*a* can be cut and formed to be offset either towards or away from the interface region between the first dielectric filter 210 and the second dielectric filter 220.

Conversely, to generate the multi L-notch between the cavity filter 100 and the first dielectric filter 210, as shown in FIGS. 11A and 11B, the first window 310*a* can be cut and formed to be offset away from the interface region between the first dielectric filter 210 and the third dielectric filter 230, towards the side opposite to this interface region. Here, the second window 320*a* can be cut and formed to be offset either towards or away from the interface region between the first dielectric filter 210 and the second dielectric filter 220.

The multi C-notch or the multi L-notch can be easily formed between the cavity filter 100 and the first dielectric filter 210 that is the dielectric filter located in the middle position among the plurality of dielectric filters, and the second dielectric filter 220 located on one side thereof.

Figure 12A:
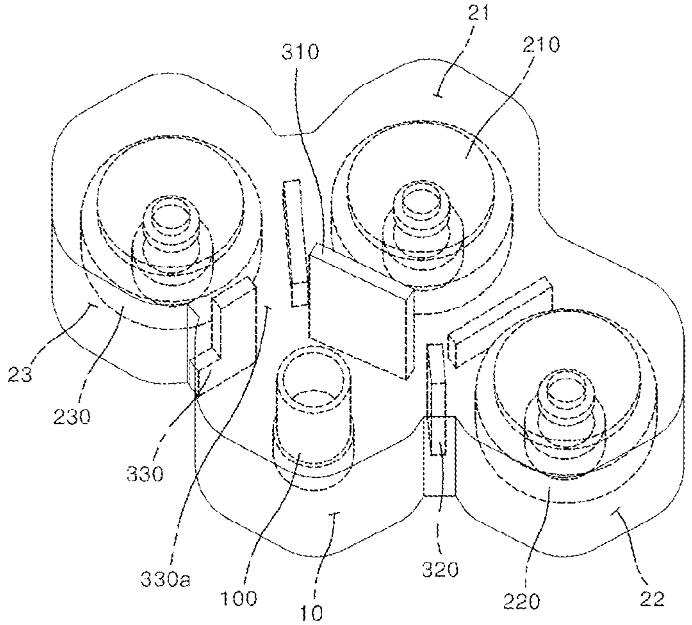
FIGS. 12A to 12C are diagrams showing a third notch generation design proposal according to the location of the window between three dielectric resonator filters adjacent to one cavity filter and a graph of the results thereof.
Figure 12B:
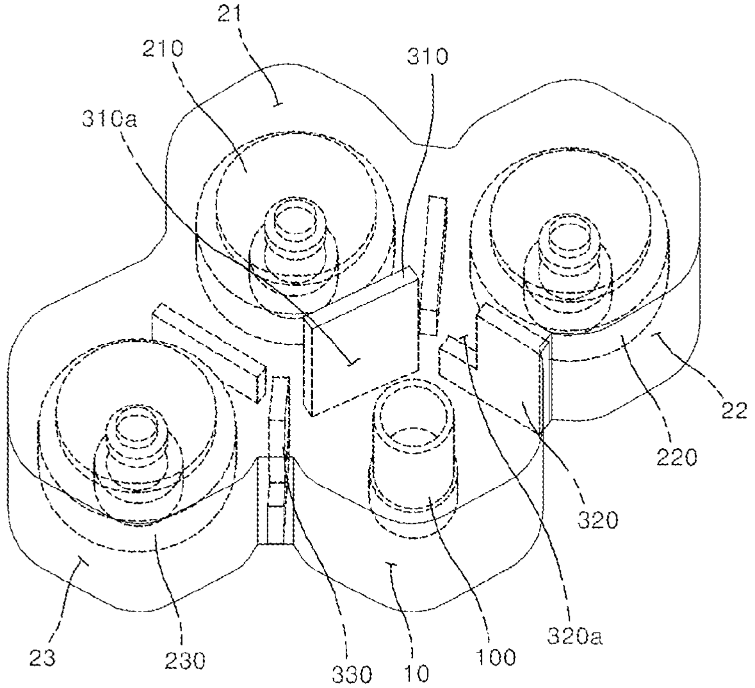
Figure 12C:
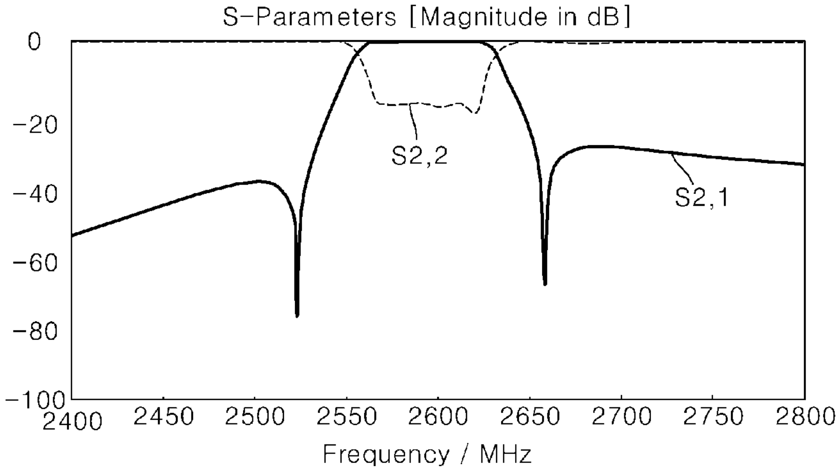

FIGS. 12A to 12C are diagrams showing a third notch generation design proposal according to the location of the window 300*a* between three dielectric resonator filters 210, 220, 230 adjacent to one cavity filter 100 and a graph of the results thereof. The graph shown in FIG. 12C is a Bode plot representing frequency response, where the x-axis (abscissa) represents frequency and the y-axis (ordinate) represents gain (dB).

As shown in FIGS. 12A and 12B, according to a multi-type filter assembly according to still another exemplary embodiment of the present disclosure, when assuming that three dielectric resonator filters 210, 220, 230 are provided and provided adjacent to each other near the reference cavity 10, defining the dielectric filter located in the middle position among the dielectric filters as the first dielectric filter 210, and defining the dielectric filter located on one side of the first dielectric filter 210 as the second dielectric filter 220, and the dielectric filter located on the other side of the first dielectric filter 210 as a third dielectric filter 230, the window 300*a* includes the second window 320*a* (FIG. 12B) not formed between the cavity filter 100 and the first dielectric filter 210 but formed on the partition wall 320 between the cavity filter 100 and the second dielectric filter 220, and the third window 330*a* (FIG. 12A) formed on the partition wall 330 between the cavity filter 100 and the third dielectric filter 230.

Here, to generate the C-notch between the cavity filter 100 and the second dielectric filter 220, as shown in FIG. 12A, the second window 320*a* can be cut and formed to be offset toward inside provided with the first dielectric filter 210. At this time, referring to FIG. 12C, it can be confirmed that the cut location of the third window 330*a* does not affect the C-notch formed through the second window 320*a*.

As described above, the multi-type filter assembly according to the exemplary embodiments of the present disclosure can be variously designed even with no separate member such as the coupling metal bar when strengthening the cross coupling characteristics between the reference cavity 10 and the adjacent cavities 21, 22, 23, thereby presenting the standards between the filters applied in the multi-type.

As described, the multi-type filter assembly according to the exemplary embodiments of the present disclosure has been described in detail with reference to the accompanying drawings. However, the exemplary embodiment of the present disclosure is not necessarily limited to the aforementioned exemplary embodiments, and it is natural that various modifications and practices within the equivalent scope can be made by those skilled in the art to which the present disclosure pertains. Therefore, the true scope of the present disclosure will be determined by the claims to be described later.

INDUSTRIAL APPLICABILITY

The present disclosure provides the multi-type filter assembly capable of applying the cavity filter and the dielectric resonator filter in the multi-type, and designing the opened direction of the window between the cavities in which each filter is located.

The invention claimed is:

1. A multi-type filter assembly comprising:

a cavity filter provided on a reference cavity of a plurality of cavities formed in a housing to be opened to one side thereof; and first and second dielectric resonator filters provided on the plurality of cavities adjacent to the reference cavity, respectively, wherein a plurality of windows are provided to be offset from locations with respect to a center thereof so that notch characteristics between the cavity filter and the first dielectric resonator filter and the second dielectric resonator filter, are adjusted by the plurality of windows that interconnect the reference cavity and the first and second cavities by cutting a part of a respective partition wall between the reference cavity and the first and second cavities, wherein the plurality of windows comprise:

a first window formed on the respective partition wall between the cavity filter and the first dielectric resonator filter; and a second window formed on the respective partition wall between the cavity filter and the second dielectric resonator filter, wherein the notch characteristics comprise at least one of a C-notch or an L-notch between the cavity filter and the first dielectric resonator filter, such that the first window is cut and formed to be offset toward an interface region between the first dielectric resonator filter and the second dielectric resonator filter.

2. The multi-type filter assembly of claim 1, wherein at least some of the plurality of windows have a predetermined height from bottom surfaces of the reference cavity and an adjacent cavity thereto.

3. The multi-type filter assembly of claim 1, further comprising a third dielectric resonator filter, wherein the first dielectric resonator filter is located on a center among the first, second and third dielectric resonator filters, the second dielectric resonator filter is located on one side of the first dielectric resonator filter, and the third dielectric resonator filter is located on another side of the first dielectric resonator filter, and the plurality of windows further comprises:

a third window formed on a partition wall between the cavity filter and the third dielectric resonator filter.

4. The multi-type filter assembly of claim 3, wherein the second window is cut and formed to be offset toward the first dielectric resonator filter.

5. The multi-type filter assembly of claim 1, wherein the notch characteristics generate an L-notch between the cavity filter and the first dielectric resonator filter, such that the first window is cut and formed to be offset from an interface region between the first dielectric resonator filter and the second dielectric resonator filter.

6. The multi-type filter assembly of claim 1, further comprising:

a third dielectric resonator filter located on the other side of the first dielectric resonator filter, wherein the plurality of windows further comprises:

a third window formed on a partition wall between the cavity filter and the third dielectric resonator filter.

7. The multi-type filter assembly of claim 6, wherein the notch characteristics generate the C-notch between the cavity filter and the first dielectric resonator filter, such that the first window formed on the partition wall between the cavity filter and the first dielectric resonator filter is cut and formed to be offset towards an interface region between the first dielectric resonator filter and the third dielectric resonator filter, and the second window formed on the partition wall between the cavity filter and the second dielectric resonator filter is cut and formed to be offset towards or away from an interface region between the first dielectric resonator filter and the second dielectric resonator filter.

8. The multi-type filter assembly of claim 6, wherein the notch characteristics generate the L-notch between the cavity filter and the first dielectric resonator filter, such that the first window formed on the partition wall between the cavity filter and the first dielectric resonator filter is cut and formed to be offset away from an interface region between the first dielectric resonator filter and the third dielectric resonator filter, and the second window formed on the partition wall between the cavity filter and the second dielectric resonator filter is cut and formed to be offset towards or away from an interface region between the first dielectric resonator filter and the second dielectric resonator filter.

9. The multi-type filter assembly of claim 7, wherein the third window is cut and formed to be offset towards or away from the interface region between the first dielectric resonator filter and the third dielectric resonator filter.

10. A multi-type filter assembly comprising:

a plurality of cavities formed in a housing, wherein one side of the housing is opened, wherein the plurality of cavities are separated by a plurality of partition walls, and wherein the plurality of cavities comprise a first cavity, a second cavity and a third cavity;

a cavity filter provided on the first cavity; and at least two dielectric resonator filters comprising a first dielectric resonator filter and a second dielectric resonator filter, wherein the first dielectric resonator filter is provided on the second cavity and the second dielectric resonator filter is provided on the third cavity, wherein the plurality of partition walls comprise a first partition wall, a second partition wall, and a third partition wall, wherein the first cavity, the second cavity and the third cavity are located such that the first cavity is adjacent to the second cavity and separated by the first partition wall, the second cavity is adjacent to the third cavity and separated by the second partition wall, and the third cavity is adjacent to the first cavity and separated by the third partition wall, wherein a plurality of windows, comprising a first window, a second window, and a third window, are formed, wherein the first window is provided on the first partition wall, the second window is provided on the second partition wall and the third window is provided on the third partition wall, wherein the second window is provided between the second cavity and the third cavity by cutting a part of the second wall such that the second window is provided laterally offset from a center thereof to be located farther from an interface region of the cavity filter and the second dielectric resonator filter and the plurality of windows adjust notch characteristics between the cavity filter and the dielectric resonator filters.

11. The multi-type filter assembly of claim 10, wherein the at least two dielectric resonator filters further comprise a third dielectric resonator filter in addition to the first and the second dielectric resonator filters, wherein the third dielectric resonator filter is provided in a fourth cavity which is adjacent to the first cavity and to the second cavity, wherein the plurality of partition walls further comprise a fourth partition wall separating the fourth cavity and the first cavity;

wherein the plurality of windows further comprises a fourth window provided on the fourth partition wall.

12. The multi-type filter assembly of claim 11, wherein the notch characteristics generate a C-notch between the cavity filter and the first dielectric resonator filter, such that the first window formed on the partition wall between the cavity filter and the first dielectric resonator filter is cut and formed to be offset towards an interface region between the cavity filter and the second dielectric resonator filter, and the second window formed on the partition wall between the cavity filter and the second dielectric resonator filter is cut and formed to be offset towards or away from an interface region between the cavity filter and the first dielectric resonator filter.

13. The multi-type filter assembly of claim 10, wherein the second window has a predetermined height from bottom surfaces of the second cavity and the third cavity.

14. The multi-type filter assembly of claim 10, wherein the notch characteristics generate a C-notch between the cavity filter and the first dielectric resonator filter, such that the first window is cut and formed to be offset towards an interface region between the first dielectric resonator filter and the second dielectric resonator filter.

15. The multi-type filter assembly of claim 10, wherein the notch characteristics generate an L-notch between the cavity filter and the first dielectric resonator filter, such that the first window is cut and formed to be offset away from an interface region between the first dielectric resonator filter and the second dielectric resonator filter.

* * * * *